Feb. 25, 1941.  C. BATCHELLER  2,232,762
COMPOSITE PANEL BOARD
Filed Nov. 27, 1937  3 Sheets-Sheet 1

INVENTOR
Clements Batcheller
BY
ATTORNEY

Feb. 25, 1941. C. BATCHELLER 2,232,762
COMPOSITE PANEL BOARD
Filed Nov. 27, 1937 3 Sheets-Sheet 2
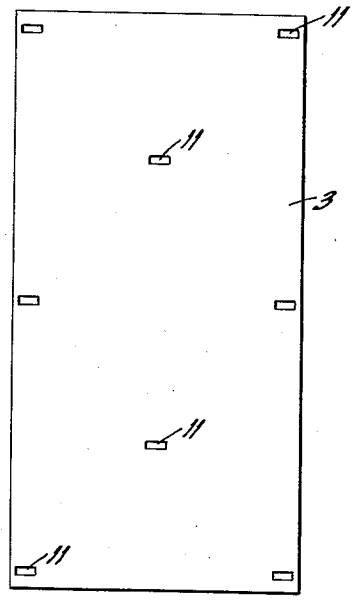
Fig. 10
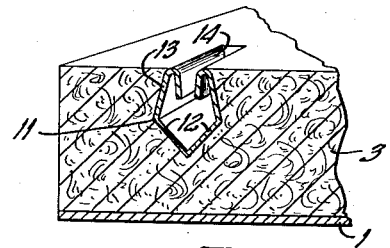
Fig. 11
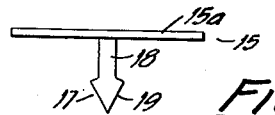
Fig. 12
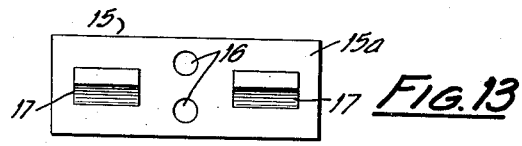
Fig. 13
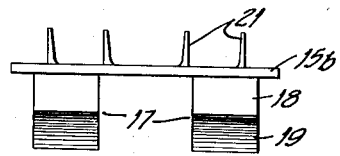
Fig. 14
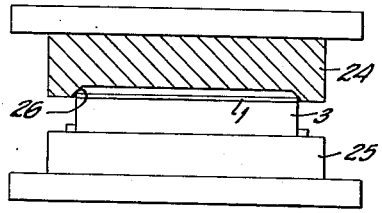
Fig. 17
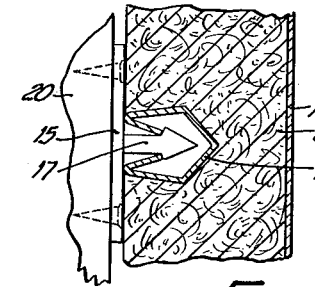
Fig. 15
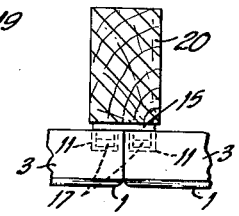
Fig. 16
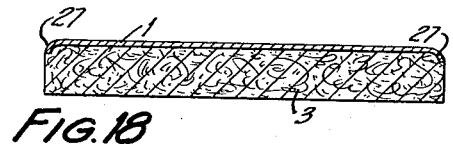
Fig. 18
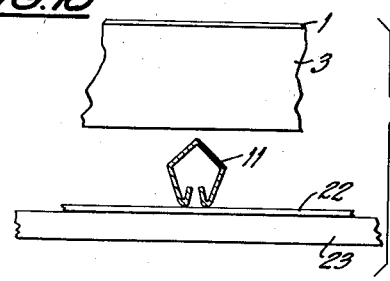
Fig. 19
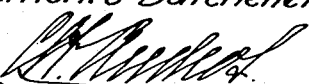
INVENTOR
Clements Batcheller
By
ATTORNEY Feb. 25, 1941.   C. BATCHELLER   2,232,762
COMPOSITE PANEL BOARD
Filed Nov. 27, 1937   3 Sheets-Sheet 3

INVENTOR
Clements Batcheller
BY
ATTORNEY

Patented Feb. 25, 1941

2,232,762

UNITED STATES PATENT OFFICE 2,232,762

COMPOSITE PANEL BOARD

Clements Batcheller, Glens Falls, N. Y., assignor to Allegheny Ludlum Steel Corporation, Pittsburgh, Pa., a corporation of Pennsylvania Application November 27, 1937, Serial No. 176,932

7 Claims. (Cl. 72—18)

My invention particularly relates to a panel board comprising a backing element and a facing element comprising at least two, thin, light gauge metal sheets so arranged as to form a metal-faced panel of a width greater than the width of the individual thin metal sheets which I contemplate using.

In my present invention, I propose to employ thin metal sheets of a thickness of the order of about .004" to .016". Such thin gauge sheets may be formed, in successful, practical production, in lengths of 500 feet and greater with a maximum width of about 27". Obviously, thin sheet products of this character are suitable for use in fabricating comparatively narrow composite products. My invention, however, contemplates the use of these strip products as a facing element for panels having a width considerably in excess of that of a single metal sheet and my invention has for a first object the provision of a composite panel board wherein the facing element comprises two thin metal strips disposed side by side, the facing of said board being completed by a suitable binding strip.

A further object resides in providing a preferred composite panel board wherein the thin metal facing element is affixed to a backing element of a hard but easily workable character and of such nature that the facing and backing elements can be firmly bonded together while the backing element is in a plastic condition. That is to say, bonding of the elements may be effected simultaneously with the pressing and densifying steps in the formation of the backing board itself.

When a facing element of such thinness as herein pointed out is affixed by means of a suitable adhesive and under pressure to a finished, hard surface, backing element, it is practically impossible to provide a smooth finish in the facing element due to imperfections existing in the surface of the backing element which cannot be eliminated and which appear in the exposed surface of the facing. Naturally, the highly polished surface of the facing element augments the appearance of imperfections existing therein.

It is, therefore, an object of my invention to fabricate a panel board of the above character which is characterized by its smooth, flawless, metallic surface of high lustre and wherein surface imperfections as are commonly present in the surface of thin sheet elements which are bonded under pressure to a hard backing element are entirely absent.

A still further object of my invention resides in the provision of a composite panel board of the foregoing character which board, on the back thereof, is provided with means for quickly but securely affixing the panel to studding or other supporting surfaces. The means which I prefer to employ for securing the panels in position is so designed that the panel may be adjusted to some degree in its application to a wall surface.

With these and other objects in view, my invention includes the novel method and the combinations and arrangements of elements described below and illustrated in the accompanying drawings, showing details to enlarged scale, in which—

Fig. 10 is a plan view of the back of my preferred panel;

Fig. 11 is a fragmentary, perspective view illustrating one element of a coupling imbedded in the backing element;

Fig. 12 is an end elevation of another element of the coupling;

Fig. 13 is a plan view thereof;

Fig. 14 illustrates a modified coupling element;

Fig. 15 is a fragmentary, elevation view, partially in section, showing the coupling elements in cooperative relationship;

Fig. 16 is a fragmentary, plan view, partially in section, illustrating two panel boards mounted in abutting relation;

Fig. 17 illustrates, somewhat diagrammatically a means for beveling the panel board;

Fig. 18 is a sectional view of a beveled board;

Fig. 19 illustrates one method of imbedding the female element of the coupling in a plastic panel;

While I may use practically any light gauge metal such as those of the so-called white or yellow groups, I prefer to use a thin, corrosion resistant, polished, alloy steel strip because of the relatively high surface lustre thereof, rendering it highly reflective, and because of its resistance to ordinary chemical and atmospheric attack which produces a tarnished or dull appearance in metals such as copper, aluminum, brass and common carbon steels.

Furthermore, in view of the properties of the preferred backing element, hereinafter described, it will be understood, although I do not necessarily wish to limit my invention thereto nor to the particular facing of stainless steel, above referred to, that I have directed the description of my invention for purposes of illustration to a composite panel board embodying such component elements because of the preferred and highly desirable characteristics thereof, hereinafter pointed out.

Figure 1:
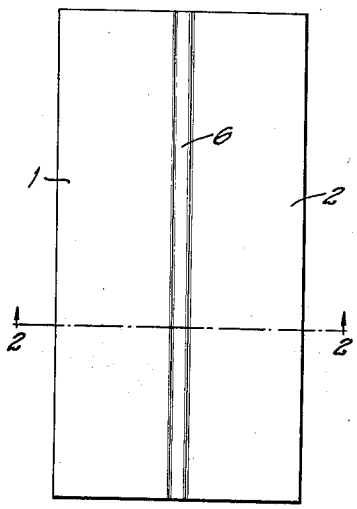
Fig. 1 is a plan view of my panel board.
Figure 3:
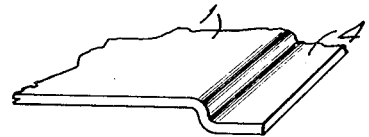
Fig. 3 is a fragmentary, perspective view of a facing element.
Figure 2:
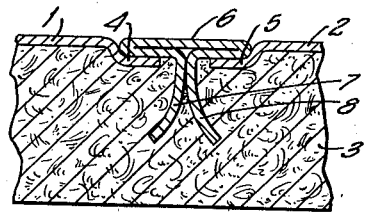
Fig. 2 is a somewhat enlarged, fragmentary, sectional view of a panel taken in about the plane 2—2 of Fig. 1.

As illustrated in Figs. 1 and 2, I contemplate employing two strips of thin, light gauge metal, preferably corrosion resistant, alloy steel, which are indicated at 1 and 2. These strips are disposed side by side, substantially adjacent each other, and affixed to a suitable backing element 3. The adjacent marginal portions of the sheet elements 1 and 2 are preferably depressed as indicated at 4 and 5, respectively, to accommodate a binding strip 6 which, when firmly anchored, is adapted to overlie said marginal portions and lie substantially flush with the surfaces of the sheet elements 1 and 2 as shown in Fig. 2.

Figures 5, 6:
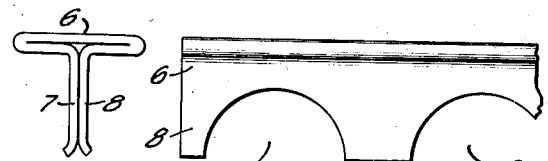
Fig. 5 is an end elevation view of one form of binding strip.
Fig. 6 is a fragmentary, side elevation view thereof.

The binding strip 6 is preferably formed from thin sheet metal as, for instance, corrosion resistant alloy steel of a thickness of the order of about .008" which, in the modification shown in Fig. 5, is bent to form a generally T-shaped structure, the stem portion thereof comprising dependent legs 7 and 8 which when imbedded under pressure in the backing element 3 are bent outwardly to anchor the binding strip thereto. The legs 7 and 8 are preferably notched or cut away as indicated at 9 in Fig. 6 in longitudinally spaced zones in order to eliminate so far as possible the formation of a weakened or frangible section in the backing element. As one alternative for the alloy steel strip above referred to and where I desire to provide a decorative, color effect, I may use either polished brass or copper to form said strip.

Figure 7:
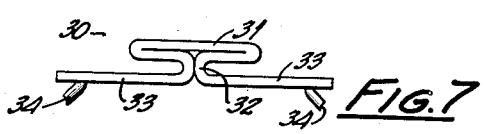
Fig. 7 is an end elevation view of a modified form of binding strip.
Figure 8:
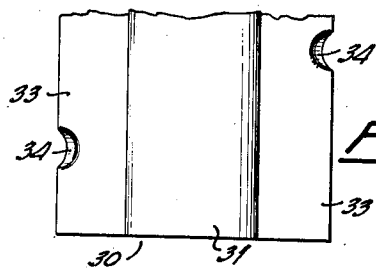
Fig. 8 is a fragmentary plan view thereof.
Figure 9:
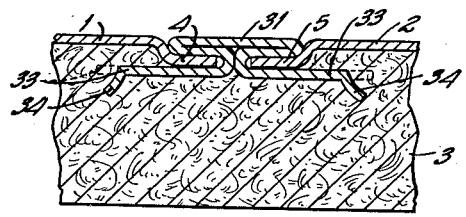
Fig. 9 is a view similar to Fig. 2 illustrating the modified binding strip imbedded in a backing element.

The modified binding strip illustrated in Figs. 7, 8 and 9 and indicated generally at 30 is also preferably formed from thin sheet metal which is bent back upon itself in a central zone to form the flattened head 31 and web 32 and thence substantially at right angles to the web portion to form laterally extending flanges 33. The head 31 and flanges 33 are preferably initially spaced to permit the insertion of the depressed marginal portions 4 and 5 of the facing elements therebetween and, of course, when the component elements of the panel board are subjected to pressure, the facing sheets 4 and 5 will be firmly gripped thereby. The flanges 33 are preferably provided with struck-down, depending lips 34, spaced longitudinally of the strip, which are adapted firmly to anchor the binding strip in the backing element as shown in Fig. 9. The binding strip 30, like strip 6 is designed to lie, in the finished panel product, with its flattened surface substantially in the plane of the surfaces of the facing elements 1 and 2.

It should be understood that long strips of thin, light gauge, alloy steel sheets in thicknesses of the order herein indicated cannot be formed under known commercial methods, such as cold rolling processes, in widths appreciably in excess of about 27". Allowing for trimming, the available strip width is about 24" or 25"; hence, such strips are admirably adapted for use in the manner indicated in the formation of composite panel boards having widths of approximately 48".

I prefer to employ a corrosion resistant alloy steel such, for example, as steel containing chromium within the ranges of so-called stainless steels, generally in excess of 8%, or chromium and other elements such as nickel. Since, in my present invention, I contemplate providing a panel board which is approximately 4 feet in width and of a length which may be varied to some extent as desired but preferably of about 8 feet, I have affixed to a backing element a facing comprising two, approximately 27" wide, strips which are disposed side by side and substantially adjacent each other. The binding strip which is also preferably formed of lustrous, corrosion resistant steel effects an entirely metal-faced product which, after fabrication, may be trimmed to desired length and width.

The backing element which I prefer to employ in my composite panel board, is preferably formed of a water plastic, cementitious material including Bentonite and a typical formula thereof is as follows:

Short asbestos fibers (waste fibers)_pounds__ 200
Calcined magnesite (200 mesh)_____do____ 40
Bentonite (colloidal clay, 200 mesh)__do____ 12
Water to plasticize_____gallons__ 20

A preferred composition of my backing element, however, may consist, for example, of the following:

| | Parts by weight |
|---|---|
| Portland cement | 335 |
| Refuse asbestos fibers to test from, 0-0-1-9 to 0-0-5-11, as "C" grade | 500 |
| Shingle stock asbestos fibers to test, from 0-4-8-4 to 0-4-10-2 | 100 |
| Calcined magnesite (ground) | 25 |
| Bentonite ("Volclay") 8 to 10 mesh | 25 to 40 |
| Water to produce approximately, a water-total solids ratio of 14:1. | |

The Bentonite content may be varied somewhat, but small quantities are extremely effective and in any case the quantity employed is less than 10% and preferably less than 5%.

The calcined magnesite is a very desirable ingredient because it increases the hardness of the product and it hydrates more rapidly than Portland cement, but it is not absolutely essential.

It is to be understood that I prefer to use backing elements generally of the above compositions because of the fact that the thin metal facing sheets may be directly bonded thereto while in a plastic or semi-plastic condition whereby a smooth and undistorted metallic facing in the finished product may be produced. This is largely attributable to the presence of Bentonite in the composition and the fact that Bentonite appears upon the surface of the backing element in a highly tacky, adhesive condition.

Figure 4:
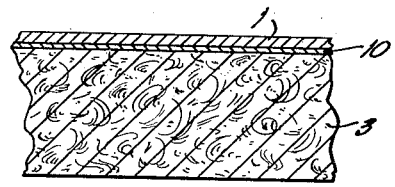
Fig. 4 is a fragmentary, sectional view through a panel illustrating the facing and backing elements adhesively secured together.

Furthermore, I prefer to include asphalt emulsion in an integral mixture with the other elements in forming the backing element and I may supply a thin coating of a suitable adhesive between the backing and facing elements as indicated at 10 in Fig. 4 to secure a very high bond therebetween. The presence of asphalt emulsion in the composition backing aids to a large degree in effectuating a firm bond between the elements and this is true irrespective of the type of adhesive employed.

Ordinarily, it is practically impossible firmly to bond a metallic sheet to a plastic backing element by means of any ordinary adhesive due to the slow setting and hardening of adhesives in contact with water-wet plastics having a relatively high alkaline content. Chemical decomposition occurs in many adhesives in the presence of strong caustic such as is present in my backing product when plastic rendering them ineffectual although otherwise ordinarily good bonding agents.

Another factor in cementing a metal sheet to a plastic backing element which must be considered is the appreciable contraction and expansion which ordinarily occurs in such plastics. However, compositions of the character herein set forth expand and contract to a very slight degree and this factor together with the use of a "cold setting" adhesive, such as I contemplate using, largely contributes to the provision of a firmly bonded, composite, panel structure.

One adhesive which I have found to be highly effectual comprises a bituminous adhesive such, for example, as asphalt emulsion which may be supplied in a thin film between the metal facing element and the backing product while plastic. The presence of asphalt emulsion in the composition backing and the thin film thereof between the facing and backing provides a firmly bonded, finished product.

I prefer, however, to employ as an adhesive an asphaltic cement such as one containing "Gilsonite" and a binder consisting of a relatively soft petroleum asphalt which has been cut back to a liquid state with a liquid such as naphtha. An adhesive of this character will set or harden even in the absence of air and is unaffected by the water present in the plastic backing element and is, therefore, admirably suited for use as a bonding agent in my composite panel board.

I also prefer to employ in the composition of the backing element a longer and tougher asbestos fiber than that hereinbefore indicated in order to provide a product having high flexural strength whereby it is admirably adapted to have molded therein binding strips of the nature herein set forth without effecting an appreciable weakness in the finished product.

Backing elements of the foregoing compositions may be formed as sheet products upon any of the known types of wet cylinder machines. The sheets so produced are removed from the machine and placed upon suitably oiled, smooth steel plates with the metal facing sheets superimposed thereon and the binding strip applied in proper position. Thereafter, these elements are subjected to sufficient pressure to effect a firm bond between the facing elements and the backing element with the binding strip firmly anchored substantially as shown in the drawings.

A multiplicity of such steel press plates with the associated elements disposed thereon may be built up or stacked and simultaneously subjected to pressure. With an applied pressure of about 1500 pounds per square inch, the backing sheet is completely dewatered and densified, the facing and backing elements firmly bonded together and the binding strip securely anchored to the backing element to form a unified panel board.

It should be noted that the head of the T-shaped binding strip is preferably flattened and formed from extremely light gauge metal so that it may be depressed substantially flush with the adjacent surfaces of the metal facing sheets without injury resulting to the steel press plates. The plastic character of the backing element permits penetration of the binding strip without offering resistance thereto sufficient to cause injury to the press plates yet, upon hardening, securely anchors the strip.

To prevent abrasion or scratching of the highly lustrous surface of the facing sheets, I deem it expedient initially to provide upon the face thereof a protective paper covering using a proprietary adhesive such as "Protex." Such paper covering and its adhesive may, at the proper time, be easily peeled from the entire sheet surface.

After the application of suitable pressure to the panel board elements, it is advisable to remove the stack from the press and maintain it intact and under pressure for a period of about ten days sufficient to effect hydration and drying of the backing element and to effect firm adhesion of the facing thereto. Thereafter, the product may be trimmed by sawing to the desired, finished size.

Figure 20:
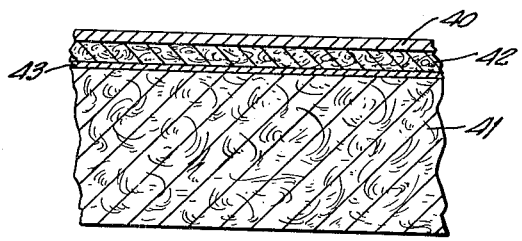
Fig. 20 is a fragmentary, sectional view of a modified type of composite panel board.
Figure 21:
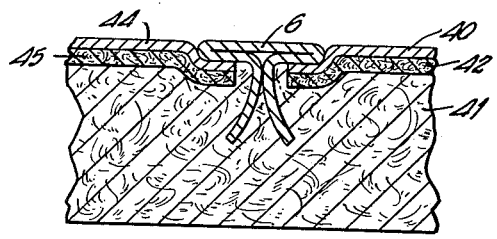
Fig. 21 is a view similar to Fig. 2 but showing my modified type of panel board assembly.

In the foregoing, I have described an embodiment of my invention wherein the thin metal strips have been applied directly to a backing element by means of a suitable adhesive. However, in the modified embodiment of my invention as illustrated in Figs. 20 and 21, I contemplate interposing between the metal facing sheet 40 and the backing element 41 a flexible, substantially inelastic element 42. It will be understood, of course, that the metal facing sheet 40 is of a thickness of the order of sheets 1 and 2, hereinbefore described, and that the backing element 41 is preferably formed of the compositions herein noted.

A suitable composition for the element 42 is a felted, fibrous sheet product such as a felted, rag-cellulose fiber paper, for example, of a weight of about 28 pounds per 108 square feet or an asbestos felted paper of a corresponding weight, which is impregnated with some substance such as asphalt or a bitumen. When exceptionally strong bonding properties are required in such element, a latex impregnated felted paper may be employed. Such a product, due to its inherent properties of flexibility and inelasticity, is adapted to be firmly bonded to the metal facing element and in the composite board serves as a "cushion" between the metal facing sheets and the backing element.

In forming a composite panel board of my modified type, I may first form the facing element which may be said, in this embodiment, to comprise the metal sheet 40 and element 42 and thereafter apply the same to the backing element while plastic and adhesively bond the elements together. The "cushioning" element 42 is commensurate in area with the metal sheet 40 and these elements may be secured together by means of an adhesive, indicated by the heavy line, such as clay base asphaltic emulsions of the "stable" type, synthetic resins, latex compositions and the like which produce a strong and effective bond therebetween.

The adhesive 43 which is supplied as a film or thin layer between the elements 41 and 42 is preferably of the type hereinbefore described and which, in one form, comprises Gilsonite, waste mineral fibers and a binder which is cut back to a liquid by naphtha. An adhesive of this character is far superior to ordinary asphaltic adhesives carrying water in their makeup because by such asphaltic-fiber adhesives only surface adhesion is effected between the elements. On the other hand, I have determined that an adhesive containing a naphtha solvent of the foregoing character fluxes the bitumen present in the "cushioning" element and a bond of high order is thereby effected.

Furthermore, an adhesive of the foregoing character, because of its high fluxing properties, not only penetrates the bitumen-impregnated element 42 to effect firm adhesion thereof to the backing element but also softens the same to further its usefulness in the elimination of inequalities or deformations in the metallic facing sheet.

As hereinbefore indicated, it is highly desirable to provide a composite panel board comprising a smooth and regular metal facing. Deformations occur when such thin metal facings are applied to hard backing elements and, as herein noted, panel boards formed by the application of thin metal facings to backing elements while plastic are practically devoid of such irregularities. However, with the incorporation of a flexible, substantially inelastic element which is interposed between the thin metal facing and the backing element the appearance of irregularities in the facing element due to imperfections which might be produced in the backing element during formation thereof is entirely precluded.

It will be understood that I may also use a cut-back adhesive of the foregoing character for combining the metal facing sheet and the "cushioning" element. Moreover, the presence of naphtha does not affect in any way the process of hydration of the plastic backing element or affect its ultimate flexural strength. Furthermore, such an adhesive is far superior to most asphalt emulsion adhesives because it does not contain water while the latter adhesives do. The presence of water prevents effective functioning of the adhesive until dehydration thereof occurs. Therefore, a cut-back adhesive containing naphtha not only effects a high bond between the elements of my panel board but also materially reduces the time required to effect the desired hydration and drying of the backing element and to effect firm adhesion of facing and "cushioning" elements thereto.

Fig. 21 illustrates a modified, structural arrangement of a composite panel board which comprises a backing element 21 with a facing including two, thin metallic sheet strips 40 and 44 together with "cushioning" elements 42 and 45, respectively, and a binding strip 6. This construction is similar to that illustrated in Fig. 2 save for the intermediate "cushioning" elements and, of course, the arrangement illustrated in Fig. 9 can likewise be followed when "cushioning" elements are employed.

The method, hereinbefore set forth, of making composite panel boards may also be followed in constructing boards embodying the modified arrangement of elements above described, and I prefer to preform the metal facing strip with a "cushioning" element affixed thereto before application thereof to the backing element.

In Fig. 10, I have illustrated a panel board wherein the backing element 3 thereof is provided with means for securing the same to a wall surface. In the embodiment illustrated, I have shown a coupling comprising cooperative male and female elements, the female element, indicated generally at 11, being imbedded and molded in the backing element and the male element being adapted to be affixed to a supporting wall surface.

The female element 11, in the embodiment illustrated in Fig. 11, comprises a thin metal element bent to form a concavity or insert, the lower side walls 12 of which are downwardly converging to provide a wedge-shaped exterior adapting it to be imbedded in the backing element. The upper side walls 13 also converge to some extent with the ends thereof bent inwardly to form spaced, reentrant lips as indicated at 14. The elements 11 are preferably formed of resilient material so that the inwardly projecting lips 14 may be forced apart to permit the passage of the cooperative male element therebetween.

A typical form of male element is shown at 15 in Figs. 12 and 13 wherein 15a indicates a base plate provided with opening 16 through which screws may pass to secure the plate to a wall surface. Projections 17, disposed in predetermined spaced relationship are adapted to engage the female element 11 and support the panel boards in abutting relation on a wall surface. As illustrated, projections 17 are formed with comparatively slender web portions 18 and tapered heads 19 forming shoulders with the webs 18. As illustrated in Figs. 15 and 16, the plate 15 is adapted to be secured in predetermined position to, for example, the stud 20 of a wall structure and the projections 17, being predeterminately spaced, are adapted to enter the female elements 11 of adjacently mounted panel boards and support the same in abutting relation. Obviously, due to the resilient construction of the reentrant lips of the femal coupling elements 11 and assuming that the male coupling elements 17 are properly positioned on a wall surface, the panel boards may be mounted and assembled merely by positioning the same with the cooperative coupling elements in registry and forcing them into interlocking relationship. The web 18 of the projections 17 is preferably of such a length that the lips 14 will engage the shoulders thereof as shown in Fig. 15 firmly to retain the panel board in position, and the openings of the elements 11 on their major axes are preferably longer than the projections to permit limited adjustment of the panel boards.

A modification of the male coupling element is illustrated in Fig. 14 wherein the plate 15b carrying the projections 17 is provided with struck-up portions 21 which serve to secure the plate to a supporting surface. Obviously, the cooperative male elements for the female elements disposed centrally of the panel boards would bear but one projection.

As illustrated in Fig. 10, the coupling elements 11 are molded in spaced relation in the backing element and preferably in staggered relation in three rows to engage the projections 17 which are designed to be located in correspondingly spaced relation when secured to studding of the usual wall structures. I have, therefore, provided a template, indicated at 22 in Fig. 19 which bears indicia denoting the proper position of the elements 11 and to which said elements may be applied and thereby predeterminately positioned and accurately spaced for application to the plastic backing sheet. The template 22, which in area may conform to that of the panel board, with the elements 11 thereon may be positioned on a suitable press plate 23 and the backing sheet carrying its facing superimposed thereon. The whole may then be subjected to pressure in the manner herein above described to produce a finished product with the coupling elements 11 firmly imbedded and molded therein.

After the composite panel board has been sufficiently cured, it may be placed between a die and die plate as indicated at 24 and 25, respectively, in Fig. 17. The die 24 is recessed and provided with beveled edges 26 whereby upon a compression of the panel board between the die and die plate, beveled edges 27 as shown in Fig. 18 are formed therein. The provision of beveled edges eliminates any necessity of using metal beading for finishing or trim purposes due to the fact that only finished marginal portions of the panel board are apparent when the panels are mounted in abutting relation.

Panel boards embodying the various modifications of my invention, of course, may be provided with means of the foregoing type and in the manner herein indicated whereby they are adapted to be easily attached to a wall surface.

It is to be understood from the foregoing description of my invention that I can and prefer to employ backing elements such as those produced in fiber felting processes and which contain a cementitious binding element capable of hardening under the influence of water and air.

From the foregoing, it should be apparent that, due to the character of the facing sheets and the composition of the backing element which I prefer to employ, a unitary, firmly bonded composite panel board structure is provided of a width exceeding that of the individual facing sheets employed and of a desirable surface area whereby it is admirably adapted for a great many uses such as wall panels and the like. Furthermore, my product may be very economically made due both to the cheapness of the component elements and the method available for constructing the same.

It will be understood that the term "facing element" as used in the claims is intended as broadly descriptive of either a thin, metal sheet element or a thin metal sheet and "cushioning" element.

While I have described my invention in its preferred embodiments, it is to be understood that the words which I have used are words of description rather than of limitation. Hence, changes within the purview of the appended claims may be made without departing from the true scope and spirit of my invention in its broader aspects.

What I claim is:

1. A composite panel board comprising a facing element including two, thin, metallic sheet elements disposed side by side and in closely spaced relation to each other, a backing element affixed to said thin sheet elements to form a unitary, composite structure and a thin, binding strip anchored in said backing element and overlying adjacent, marginal portions of said sheet elements.

2. A composite panel board comprising a facing element including two, thin, metallic sheet elements disposed side by side and in closely spaced relation to each other, a backing element affixed to said thin sheet elements to form a unitary, composite structure, said sheet elements having depressed, marginal portions, and a binding strip anchored in said backing element and overlying adjacent, depressed, marginal portions of said sheet elements, the exposed surface of said strip lying substantially in the plane of the surfaces of said sheet elements.

3. A composite panel board comprising a facing element including two, thin, metallic sheet elements disposed side by side and in closely spaced relation to each other, a backing element affixed to said thin sheet elements to form a unitary, composite structure and a binding strip; said strip forming a substantially T-shaped structure, the head thereof overlying adjacent, marginal portions of said sheet elements and the stem of said strip extending within said backing to anchor said strip thereto.

4. A composite panel board comprising a facing element including two, thin, metallic sheet elements disposed side by side and in closely spaced relation to each other, a backing element affixed to said thin sheet elements to form a unitary, composite structure and a thin, binding strip disposed to overlie adjacent, marginal portions of said sheet elements and having a notched web portion imbedded in said backing element for securing said strip thereto.

5. A composite panel board comprising a facing element including two, thin, metallic sheet elements disposed side by side and in closely spaced relation to each other, a backing element affixed to said thin sheet elements to form a unitary, composite structure and a binding strip secured to said backing element and provided with a groove disposed to receive marginal portions of a sheet element.

6. A composite panel board comprising a facing element including two, thin, metallic sheet elements disposed side by side and in closely spaced relation to each other, a backing element affixed to said thin sheet elements to form a unitary, composite structure and a binding strip provided with grooves adapted to receive adjacent, marginal portions of said sheet elements and with means for anchoring said strip to said backing element.

7. A composite panel board comprising a facing element including two, thin, metallic sheet elements disposed side by side and in closely spaced relation to each other, a backing element affixed to said thin sheet elements to form a unitary, composite structure, said sheet elements having depressed, marginal portions, and a binding strip anchored in said backing element and overlying adjacent, depressed, marginal portions of said sheet elements, the sides of said strip substantially abutting the sides of the depressed portions of said sheets and the surface thereof lying substantially even with the surfaces of said sheets whereby to approximate a substantially smooth surfaced panel, and the edges of said panel being beveled.

CLEMENTS BATCHELLER.